(12) United States Patent
Carter (10) Patent No.: US 6,513,849 B2
(45) Date of Patent: Feb. 4, 2003

(54) MODULAR TRUCK RACK

(76) Inventor: Robert O. Carter, P.O. Box 1002, Diamond Springs, CA (US) 95619

( * ) Notice: Subject to any disclaimer, the term of this patent is extended or adjusted under 35 U.S.C. 154(b) by 0 days.

(21) Appl. No.: 09/850,428

(22) Filed: May 7, 2001

(65) Prior Publication Data

US 2002/0163214 A1 Nov. 7, 2002

(51) Int. Cl.$^7$ .................................................. B60P 3/00
(52) U.S. Cl. ............................ 296/3; 224/310; 224/405
(58) Field of Search ............................ 296/3; 224/403, 224/524, 405, 310

(56) References Cited

U.S. PATENT DOCUMENTS

| | | | | | |
|---|---|---|---|---|---|
| 2,570,802 A | * | 10/1951 | Hatteburg | ..................... | 296/3 |
| 2,947,566 A | * | 8/1960 | Tower | ........................... | 296/3 |
| 3,594,035 A | * | 7/1971 | Ferguson | ..................... | 296/3 |
| 3,972,433 A | * | 8/1976 | Reed | ........................ | 224/310 |
| 4,138,046 A | * | 2/1979 | De Freze | ................... | 224/405 |
| 4,152,020 A | * | 5/1979 | Brown et al. | .................. | 296/3 |
| 4,211,448 A | * | 7/1980 | Weston | ......................... | 296/3 |
| 4,398,763 A | * | 8/1983 | Louw | ............................ | 296/3 |
| 4,405,170 A | * | 9/1983 | Raya | ............................ | 296/3 |
| 4,509,787 A | * | 4/1985 | Knaack et al. | ................. | 296/3 |
| 4,676,543 A | * | 6/1987 | Lewis | ........................... | 296/3 |
| 4,770,458 A | * | 9/1988 | Burke et al. | ..................... | 296/3 |
| 5,005,892 A | * | 4/1991 | Haugen et al. | ................ | 296/3 |
| 5,061,000 A | * | 10/1991 | Haugen et al. | ................ | 296/3 |
| 5,108,141 A | * | 4/1992 | Anderson | ..................... | 296/3 |
| 5,143,415 A | * | 9/1992 | Boudah | ........................ | 296/3 |
| 5,152,570 A | * | 10/1992 | Hood | ............................ | 296/3 |
| 5,190,337 A | * | 3/1993 | McDaniel | ..................... | 296/3 |
| 5,476,301 A | * | 12/1995 | Berkich | ......................... | 296/3 |
| 5,480,205 A | * | 1/1996 | Tayar | ............................ | 296/3 |
| 5,628,540 A | * | 5/1997 | James | ........................... | 296/3 |
| 5,692,791 A | * | 12/1997 | Sulzer | ............................ | 296/3 |
| 5,927,782 A | * | 7/1999 | Olms | ............................. | 296/3 |
| 6,186,571 B1 | * | 2/2001 | Burke | ............................ | 296/3 |

* cited by examiner

Primary Examiner—Kiran Patel
(74) Attorney, Agent, or Firm—Mark C. Jacobs (57) ABSTRACT

A modular truck rack formed from a plurality of standardized preformed parts which are used along with several other parts that can be made in varying extensions, permits the interchange of the components in every rack, and the replacement of certain others to size up or size down the same rack to fit any size truck of the same type such as a pickup. An easily removable rear bar—no tools required—permits the truck bed of a pickup truck to carry tall upright items such as a refrigerator without the necessity of dismantling the rack other than the removal of the rear bar.

9 Claims, 7 Drawing Sheets

MODULAR TRUCK RACK

FIELD OF THE INVENTION

This application pertains to truck racks primarily for use on pickup trucks for the carrying of sheets of plywood and various lengths of lumber.

BACKGROUND OF THE INVENTION

This invention pertains to modular truck racks which can be manufactured at significantly lower cost due to the fact that many parts are interchangeable and can be utilized with various truck models.

It is a first object of this invention to provide a modular truck rack.

It is a second object to provide a truck rack that utilizes a minimum number of different diameter pipe sections.

It is a third object to provide a truck rack that can be shipped knocked down in a rectangular box to reduce shipping cost.

It is a fourth object of this invention to provide a truck rack that can be readily assembled at the facility of the purchaser.

It is a fifth object to provide a truck rack that can be readily modified to fit both short bed and long bed pickup trucks.

It is a sixth object to provide a modular truck rack that can be modified by the interchange of components to fit full-size and compact pickup trucks.

Other objects of the invention will in part be obvious and will in part appear hereinafter.

The invention accordingly comprises the device possessing the features, properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

SUMMARY OF THE INVENTION

The truck rack of this invention utilizes a plurality of interchangeable preformed rack portions some of the components of which come in varying extensions, which are interconnected to each other to create a truck rack, specifically sized for the truck of the purchaser. The same variety of truck rack can be made shorter, longer, wider, or narrower as is necessary to be correctly sized to fit a specific truck. It is to be seen that there are two variables to be considered in sizing a truck rack. They are the width and length of a truck. By changing the transverse members and the interconnecting members and utilizing the same upper front portion and the same rear portion of a rack configuration,—standardized components—inventory control can be simplified, and thus costs can be reduced.

DESCRIPTION OF THE PREFERRED EMBODIMENT

Figure 1:
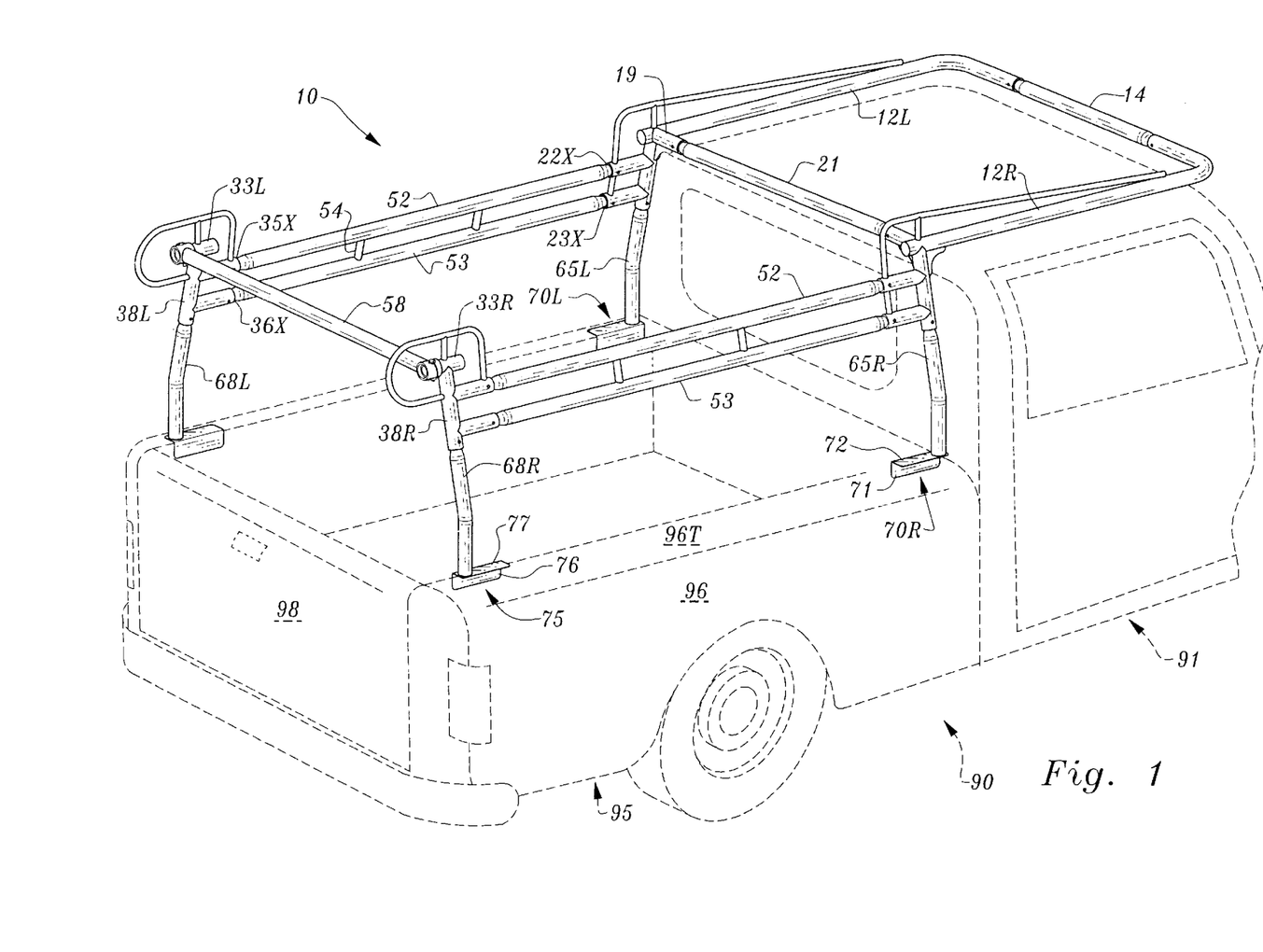
FIG. 1 is a perspective view of the first embodiment of this invention for a modular truck rack. The truck shown in dashed lines forms no part of the design.

In FIG. 1, there is shown the modular truck rack of this invention, mounted upon a typical pickup truck. The pickup truck being shown in dashed lines is understood not to form a part of this invention. The truck rack of this invention is comprised of four portions. The first is the upper or cab-over portion. The second is to the rear portion. The third is the intermediate portion which connects the first and second portions. The fourth portion is the set of four legs and their respective mount plates for attachment to the truck.

Figure 2:
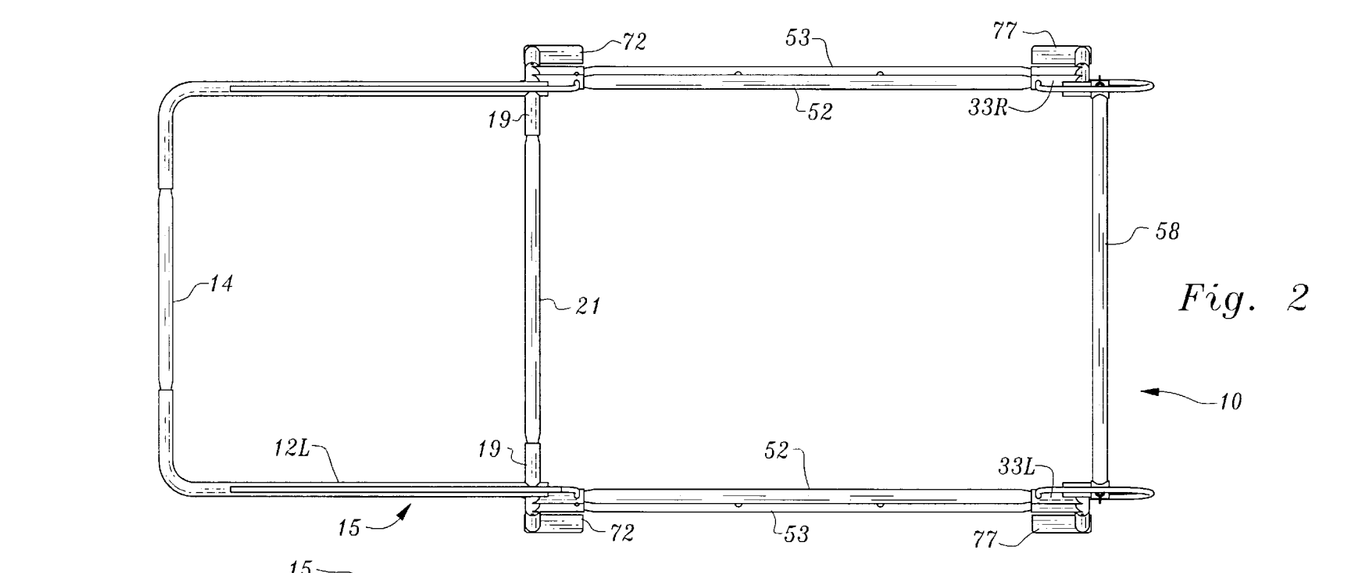
FIG. 2 is a top plan view thereof

FIG. 2 is a top plan view of the truck rack of this invention.

Figure 3:
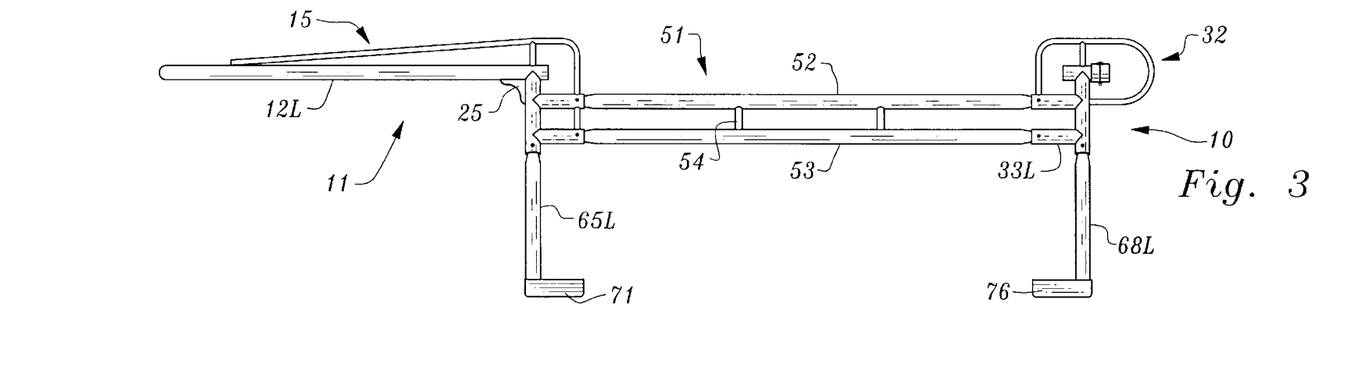
FIG. 3 is a left side elevational view of the first embodiment of this invention. The right side thereof is a mirror image.

FIG. 3 is a left side elevational view thereof The right side is a mirror image of the left side.

Figure 4:
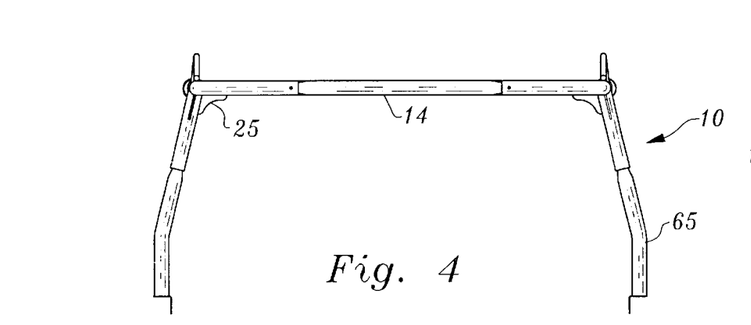
FIG. 4 is a front elevational view of this first embodiment.
Figure 5:
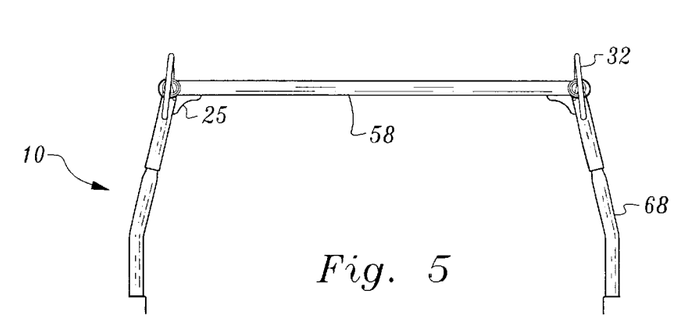
FIG. 5 is a rear elevational view of this first embodiment.

Reference to FIG. 4 shows that this is a front elevational view, while FIG. 5 is a rear elevational view of the first embodiment of this invention.

Figure 6:
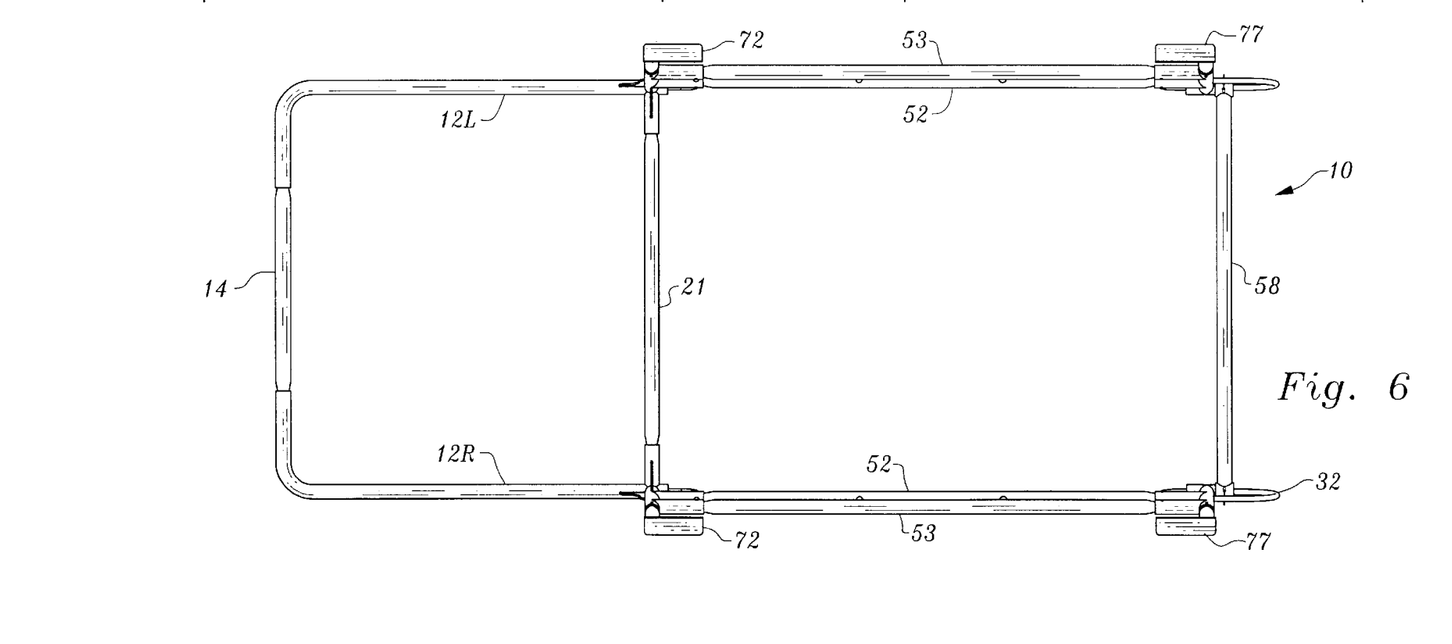
FIG. 6 is a bottom plan view of the first embodiment of this design.
Figure 7:
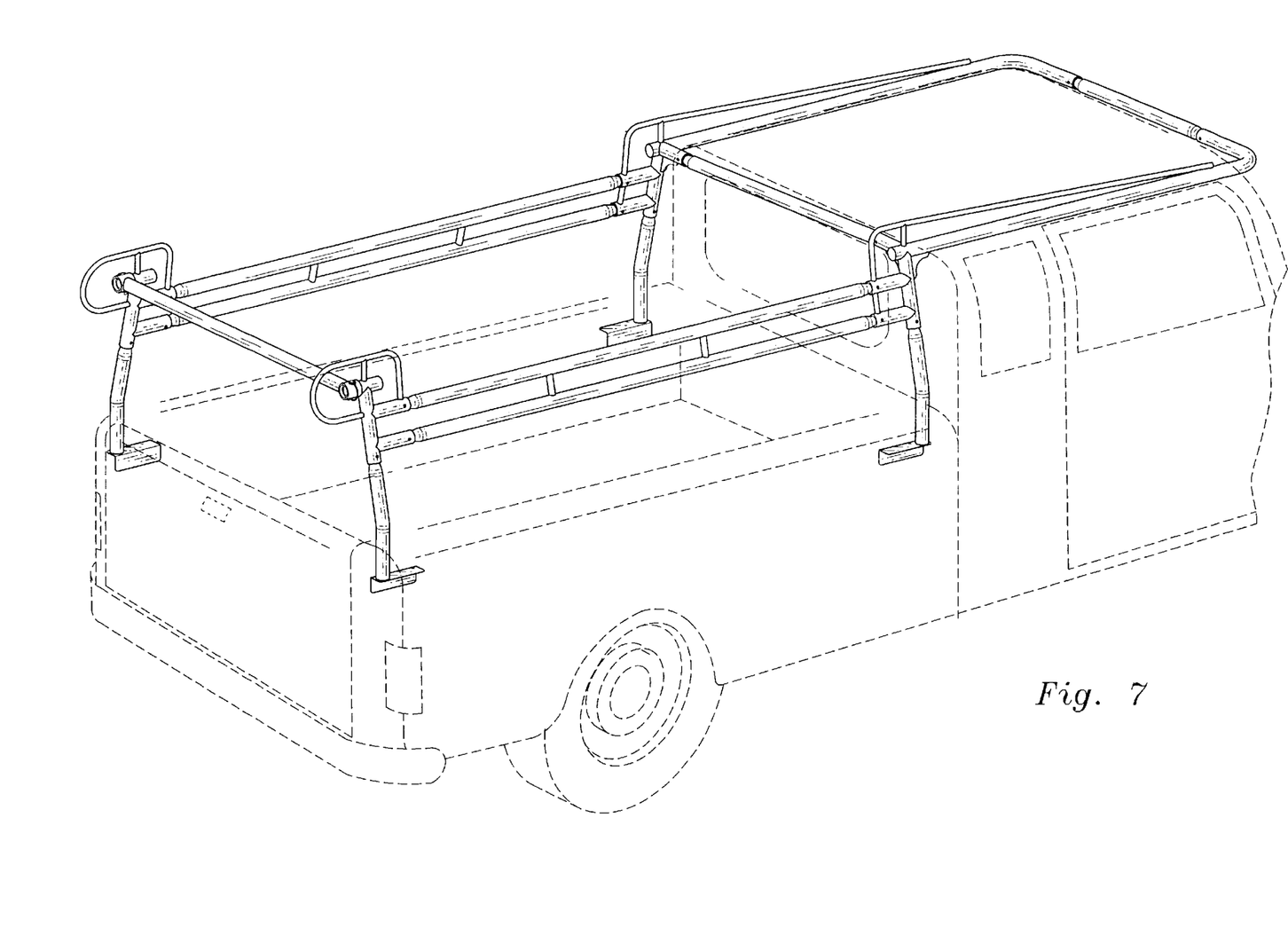
FIG. 7 is a perspective view of the second embodiment of this invention for a modular truck rack. The truck shown in dashed lines forms no part of the design.

The last view to be quickly noted is FIG. 6 which is a bottom plan view of this first embodiment. The differences between the first embodiment and the other embodiments still to be discussed will be set forth infra.

The invention will best be understood by references to FIGS. 8 through 14 inclusive which show the individual portions of this invention. Mention should be made that each of these portions is applicable to any truck size and truck model. In order to change the size of the truck rack of this invention, the changes or distinctions to be made will be the lengthening of the intermediate portion to be discussed with respect to FIG. 9 and the sizing of the transverse connectors 14 and 21 to be discussed with respect to FIG. 14. Of course, changes can be made in the standardized sections as well to achieve additional embodiments.

Figures 8, 9, 10:
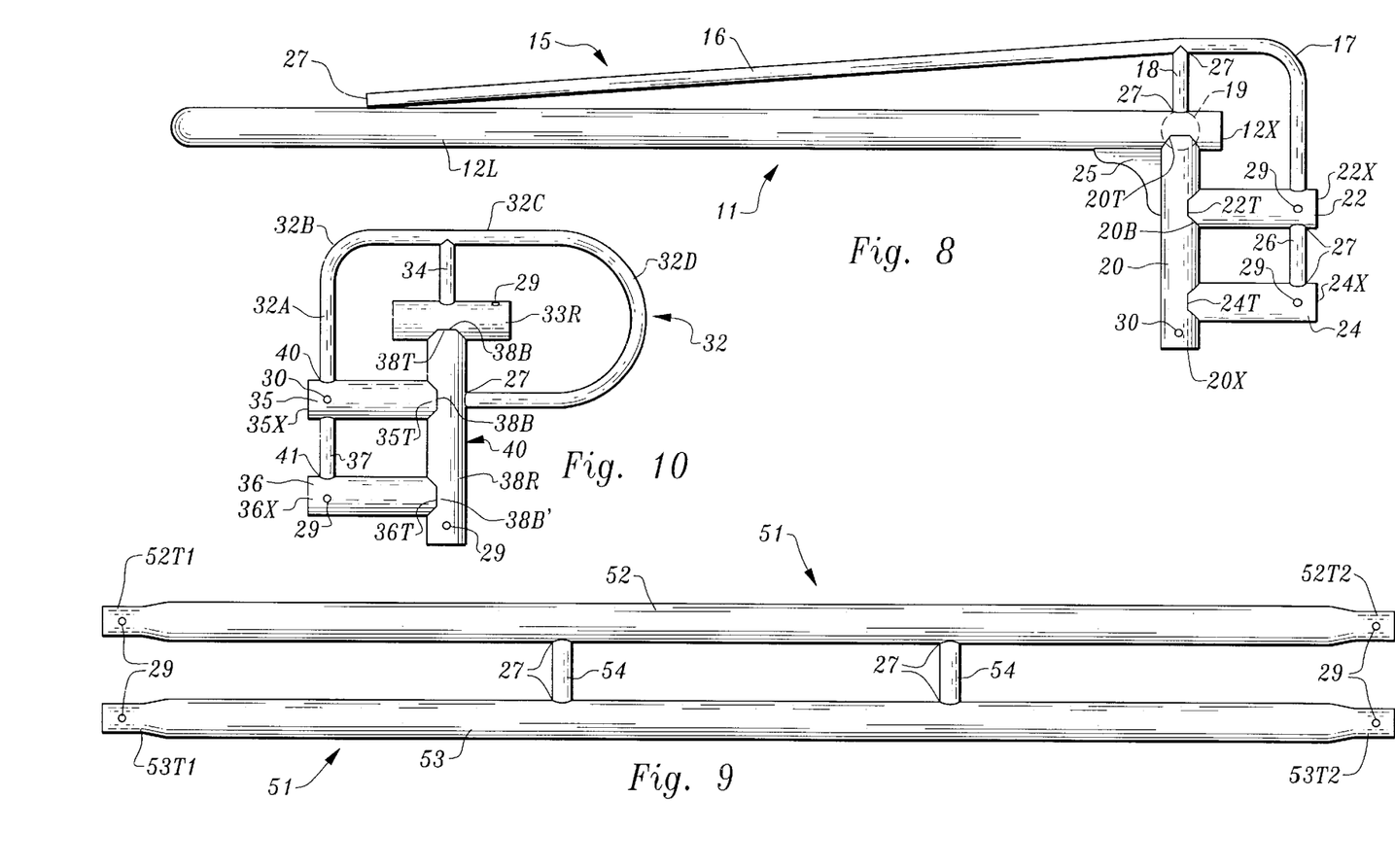
FIG. 8 is a side elevational view of the left cab-over portion. The right cab-over portion is a mirror image thereof.
FIG. 9 is a side elevational view of the connecting portion of this invention.
FIG. 10 is a side elevational view of the left upper rear portion of this invention. The right upper rear is a mirror image thereof.

Therefore, the discussion will now commence with FIG. 8 which depicts the left cab-over or upper portion. It should first be noted that all junctions not discussed as being a tapered end of a tubular member disposed within a bore of another tubular member—per the discussion supra of FIG. 13, should be deemed to be welded joints some of which have been designated 27. For ease and convenience many weld joints have been omitted from the drawings and will not be specifically discussed.

The discussion commences with the first portion, the first element of which is seen to be a main J-shaped tube 12, which is horizontally disposed and inwardly facing. Here, the left such tube is designated 12L. The shape is conformed by reference to FIG. 14. At approximately 1⅛ inches inwardly along the length of upper front tube 12L, and angularly welded thereto, is the upper arch section 15, and more specifically the first arch member 16. One end of first arch member 16 is welded at weld 27 on tube 12L. The distal end of member 16 is welded or otherwise connected to inverted J-shaped second arch member 17, at the upper end thereof Spaced inwardly from the rear end of horizontally disposed 12L and welded thereto is arch support 18, a narrow tubular member. Member 18 is disposed in a vertical disposition and is welded or otherwise attached to the terminus of the upper end of the member 17.

A short transverse tubular section 12, as noted in FIG. 8 by the dotted circle 19 will be discussed infra in connection with FIG. 14. The junction of the first arch member 16 and second arch member 17 is found at approximately the same location as the junction and arch support 18 to section 17. Therefore, the discussion will now commence with FIG. 8 which depicts the left cab-over or upper portion. This portion is seen to be a main J-shaped tube.

Disposed in alignment with arch support 18 is an upper vertical member 20. Upper vertical member 20, which is tubular includes an upper tapered segment 20T which is disposed within a suitable bore in member 12L, 180 degrees opposed from arch support 18 in a downward disposition. Upper vertical member 20 is a tubular member and has an opening at its lower end 20X. Spaced up slightly from the lower end is through bore 29 for receipt of pin 30. Upper end 20T, which is tapered to a narrower cross section is disposed within a bore 12B on the underside of upper front tube 12L on what would be the underside of said tube.

Upper vertical member 20 also includes a pair of aligned bores, 20B in a rearward disposition for the receipt of the first and second upper horizontal tubes 22 and 24. Each of these has a forward tapered end 22T and 24T which are inserted into their respective opening in upper vertical tube 20.

The lower end of inverted J-shaped member 17 is welded to the top surface of the first upper horizontal tube 22, adjacent the rear edge thereof. A short connector narrow tube 26 is welded in place vertically between the two larger diameter tubes 22 and 24, preferably in vertical alignment with J-shaped member 17.

An optional flat gusset 25 may be welded at the junction of tube 12, here 12L and upper vertical tube 20.

For ease of construction and for ease of understanding in the discussion herein, all "narrow" and all "wide" tubing will each be of uniform diameter where shown in the figures and as discussed.

The next portion to be considered is the rear portion 31, as seen in FIG. 10. The first section seen is the fancy bar 32, which for weight purposes may be tubular. It is of the narrow dimension and includes a first vertical segment 32A, which is integrated into a rearwardly disposed arcuate section 32B, which in turn is integral to a horizontal section 32C, which in turn is integrated into a terminal sidewardly disposed U-shaped segment 32D. The terminus of segment 32D is welded to the rear main support 38, here 38R for right side. The weld point is on the rear face of this wide vertically disposed tubular member, at slightly above the midpoint in the elevation.

At the lower end of rear main support tube 38 is a through bore 29 for receipt of a pin 30. The upper end of this support tube has a tapered area 38T which is inserted in a bore 33B of rear transition tube 33, here 33R is horizontally disposed. An opening 39 is seen for the ultimate insertion of rear transverse member 58 during the assembly of the truck rack 10.

Spaced rearwardly of the opening 39 and on the same face of the tube 33 is a throughbore 29 for the insertion of a pin 30. A narrow vertically disposed tube 34 is welded in position between horizontal tube 33 and segment 32C of the fancy bar 32. Tube 33 may be sealed off at one or both ends or left open as may be desired.

A first spaced wide tube 35 has the second terminus of fancy bar 32 welded onto its top surface per FIG. 10. Tube 35 includes a bore facing inwardly, unnumbered here but similar to bores 29 and a pin 30, is shown disposed in such unseen bore. A tapered end 35T is rearwardly directed and disposed in bore 38B of wide tube 38, said bore 38B having a forwardly disposition.

A second spaced wide tube 36 is spaced below tube 35 and also includes a bore 29 also for receipt of a pin 30. Its tapered end 36T is disposed in a bore 38B in tube 38. The two spaced wide tubes 35 and 36 are disposed in a parallel relationship.

Shown in FIG. 10 is a small vertical tube 37, interposed at the forwardly disposed ends of the two tubes 35 and 36. It is also shown to be in vertical alignment with segment 32A of fancy bar 32. As an aside it may be mentioned that fancy bar 32 maybe either a solid bar or a tubular member referred to as a bar. Tube 37 may be a separate tube welded into place or it may be preferably an extension of segment 32A, placed through a pair of aligned bores in the respective parallel spaced wide tubes 35 and 36, which bores are designated 40 and 41 respectively. If tube 37 is a separate location welded in a place member then the bores and pins which pass through tubes 35 and 36 can be eliminated. Of course, for pins or bolts 30 to pass through an extension of segment 32A, though bores—not seen—must be pre-drilled through the proper location in extended downwardly disposed tube 37 that would fit into opening 41.

The third portion to be discussed is the intermediate portion 51 which is seen by itself in FIG. 9. This portion is comprised of two interconnected spaced, equal in length and parallel, tubes 52 and 53. Each tube 52 and 53 has a tapered end at the distal and proximal ends thereof, and which are designated, 52T1, 52T2, 53T1 and 53T2 respectively. Each tapered end includes a bore 29. Tubes 52 and 53 are in vertical alignment, and are connected to each other by a pair of spaced vertically disposed similar narrow tubular or bar members 54.

From FIG. 1 it is seen that one set of the tapered ends of pipe 52 fit into openings 35X and 36X respectively of the rear portion, on both the left and right side of the rack 10. The other set of tapered ends fit into the openings 22X and 23X respectively of the upper front cab-over portion. Reference to FIG. 1 teaches the reader that the lengthening or shortening of the intermediate portions two tubes, when used with the standardized front and rear portions, permits a truck rack to be made to fit varying length pickup trucks.

While the intermediate portion dictates the overall length of the rack 10 the width thereof is dictated by the extension of front tube 14, intermediate transverse tube 21, toward the front and rear transverse tube 58. Each of tubes 14, 21 and 58 include a pair of oppositely tapered ends, one such of each tube 14 and 21 being visible in FIG. 14.

Figures 11, 12, 13, 14:
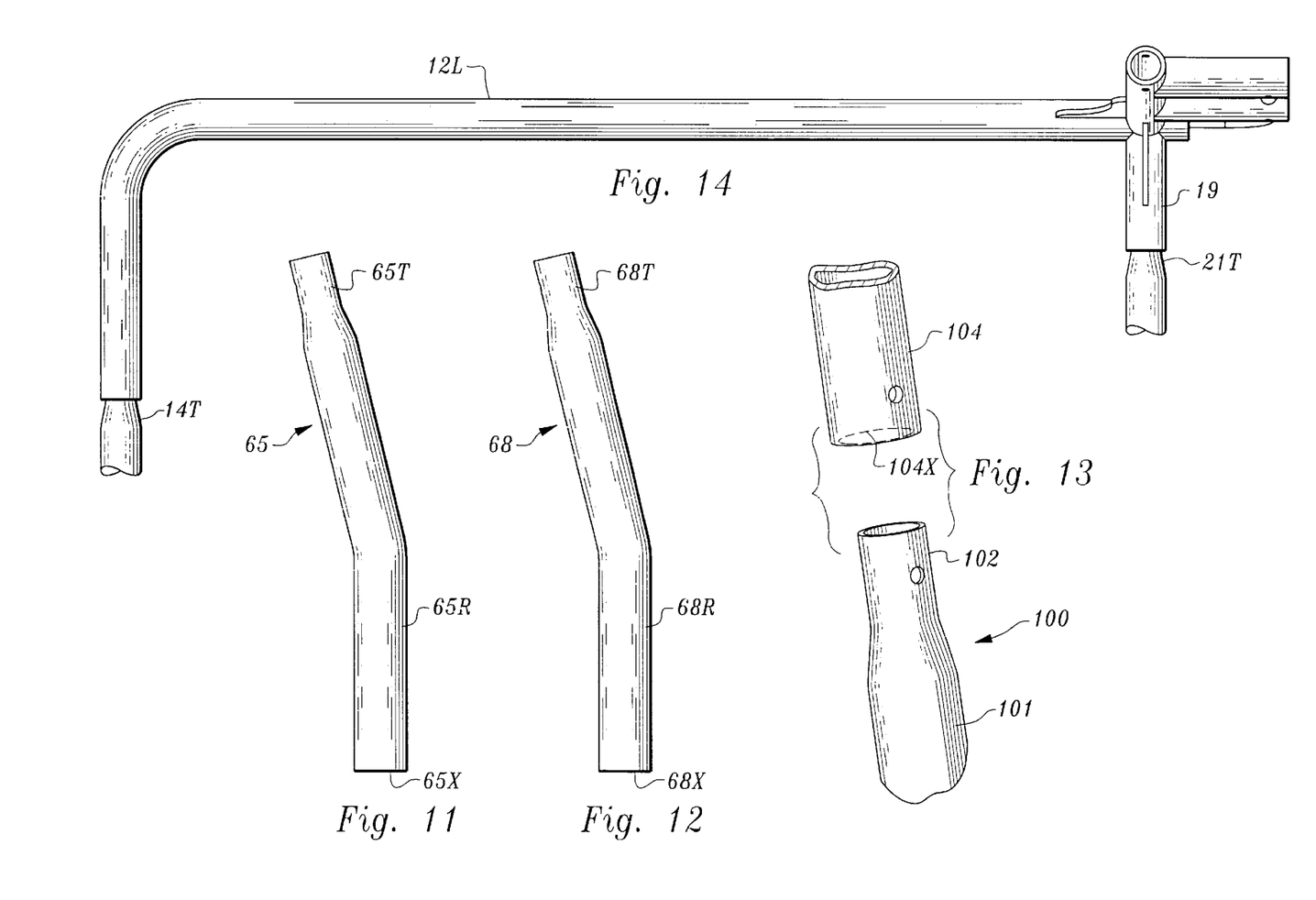
FIG. 11 is a perspective view of one front leg.
FIG. 12 is a perspective view of one rear leg.
FIG. 13 is a closeup view of a typical insertion pipe junction employed with this invention.
FIG. 14 is a bottom plan view of the left side upper portion of this invention.

In FIG. 14, a bottom plan view, the presence of the short transverse tube 19 which is welded to tube 12L is seen. Transverse tube 19 is also seen in FIGS. 1 and 8. The third transverse tube 58 which has a pair of tapered ends, not seen, is disposed within the bores 39 of the two respective rear portions 31 per FIG. 10.

It is seen that the lateral extension of the three transverse members 14, 21, and 58 define the overall width of the truck rack of this invention. By adjusting the fixed extension to be smaller or greater, a modular truck rack to fit various width pickup trucks can be achieved.

The discussion now moves to the leg members. One of the mirror image front legs 65 is seen in FIG. 11, namely the right one 65R, and one of the mirror image rear legs 68 is seen in FIG. 12, namely 68R. Both the front and rear legs are tubular lengths each with a single bend therein at about the midpoint along the length thereof. Each of 85 and 68 has a tapered upper end 65T and 68T first section respectively, a straight second section, and an angular third open end, each third end being attached to a mount plate 70 for the front and 75 at the rear for their lower ends respectively. Reference may also be made to FIG. 14 which illustrates the interlocking of both front legs with the transverse central tube, and to FIG. 5 which depicts both rear legs 68 and the transverse member 58 that interconnect thereto. In these two figures, an optional reinforcement gusset 25 is seen at two locations in each figure which gussets cannot be seen from the side elevational views.

Mount plates are used to attach the front and back legs to the truck bed. See FIG. 1. Front mount plate here 70R, with the left unit being 70L, has a vertical section 71 and a horizontal section 72. These plates are bolted or welded to the truck bed side 96's top wall 96T at the choice of the customer. The rear mount plate 75 is of similar configuration and has a vertical section 76 and a top section 77, and is attached in like manner at the user's option. The legs are preferably welded or otherwise attached to the mount plate by the vendor to assure proper angular alignment with the mount plate.

Tubular sections could be added to the front and rear mount plates sized for the receipt of the front and rear legs, and such is contemplated by this invention. However, for stability a permanent welded attachment of the legs to the respective mount plates as noted is suggested.

In FIG. 13, is a typical unspecified diagram used to illustrate the interconnection 100 of the tapered section of one tube 101 with another tube. Tube 100 has a tapered end 102 which is seen ready to engage the bottom opening 104X of tube 104.

Figure 15:
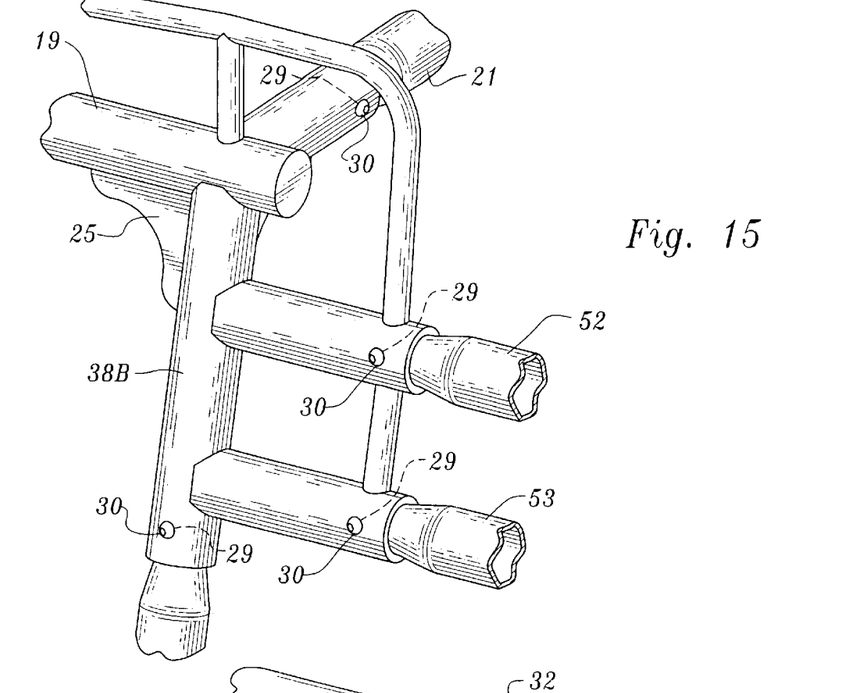
FIG. 15 is a right side closeup perspective view of a section of the cab-over or upper portion of this invention.

FIG. 15 is a closeup view of a portion of the forward end this invention to illustrate in detail the placement of the pins 30 in bores 29 at certain strategic locations where a tapered end interconnects with an open end of a wide tubing takes place. Pins 30 are threaded on an end and receive a conventional nut thereon.

Figure 16:
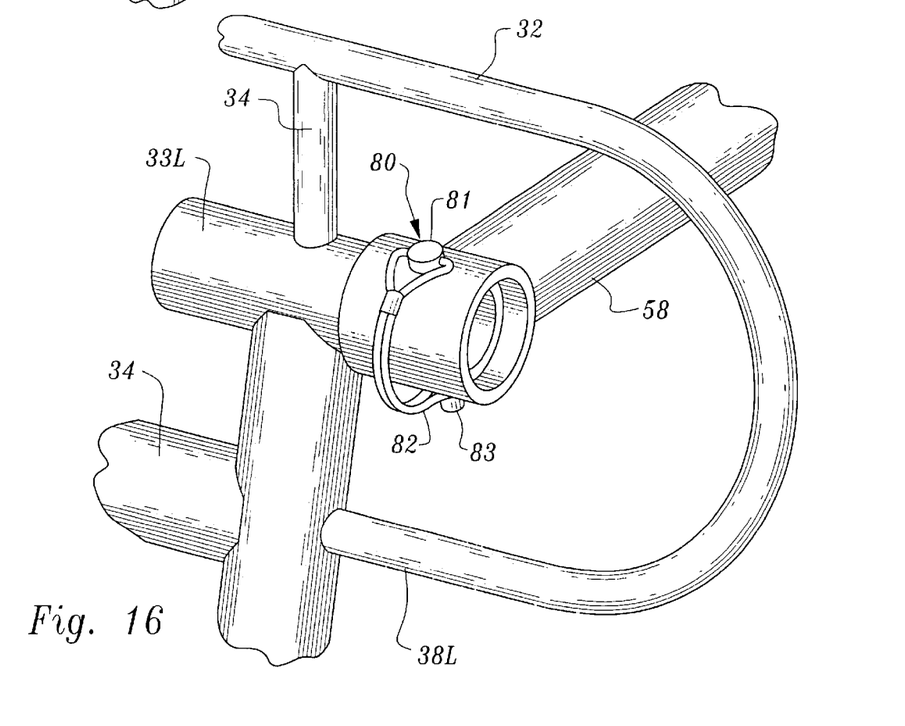
FIG. 16 is a closeup perspective view of a segment of this invention and is related to FIG. 10.

In FIG. 16 an optional but preferred mode of attachment of the rear transverse member 58 is depicted. Rather than utilize a conventional threaded bolt with a nut, which requires the use of a hand tool for nut removal, a D-connector is employed instead. This connector is made off shore and is available from RWN Supply of Shingle Springs, Calif. The connector 80 employs a non-threaded bolt 81 with a wire-like member attachment that attaches to the bolt adjacent the head thereon while the tail end hangs free. After the bolt is inserted into its locale, the spring wire segment 82 is overlaid onto the pin 81's end 83 and is retained in position by friction. By employing this type of connector the user can readily change from the ability to carry plywood and other lumber to carrying an upright refrigerator in the truck bed. No interference is made due to the location of the intermediate tube 21 out of the way adjacent the truck cab.

It is seen that in this invention there are a few mirror image components. The discussion of one of the two mirror images is deemed to be adequate such that to discuss the other mirror image member need transpire. Thus the mount plates, the front legs 65 and the rear legs 68, long bar 12 and the rear transverse tube 33, are all either left or right-hand versions of the respective component.

It is seen that I have provided an apparatus that can employ a finite number of standardized parts to put forth truck racks suitable to all sizes of trucks from the tiniest old Datsun pickup to the new Toyota Tundra® or Ford 150. By having a plurality of interlocking components, the truck racks of this invention can be shipped knocked down, by commercial delivery service such as United Parcel Service. The ability to ship in a smaller box not only saves on freight but permits the retailer to carry a larger inventory in a smaller space. This statement can be safely made because the typical truck rack is shipped preformed, requiring two or more people to handle, since it is shipped fully assembled with all tubing wrapped in foam sheets to keep the tubing paint free from injury.

Thus the modular truck rack of this invention fills a long felt need for a high quality, low price, easily shipped truck rack that can be sent to a rancher in the wilds of North Dakota or the swamps of mid Florida where a dealer might be hundreds of miles away.

Since certain changes may be made in the above described apparatus without departing from the scope of the invention herein involved, it is intended that matter contained in the above description and shown in the accompanying drawings should be interpreted as illustrative and not in a limiting sense.

I claim:

1. A modular truck rack assembled from a plurality of interchangeable preformed rack portions, which rack portions are interconnected to each to create a truck rack, which is thus sized in this manner to fit a specific truck model, which rack comprises:

a] a pair of mirror image cab over portions;

b] a pair of mirror image rear portions;

c] a pair of similar variable length intermediate portions which interconnect a respective front and a respective rear portion, d] a variable front and rear leg portion which comprises a pair of mirror image front legs, each attached to a mount plate, and a pair of mirror image rear legs, each attached to a mount plate;

e] a trio of similar variable length transverse members, two of which connect each front portion to the other, and one of which connects each rear portion to the other, wherein each cab over portion comprises:

a J-shaped tube horizontally disposed and having an inward facing lower end and rear facing top end, which has a supported upper arch section welded thereto;

and having a short transverse inwardly extending tubular section, extending from said J-shaped tube normal to an upper vertical member is disposed inwardly from the rear facing top of the J-shaped member in a downwardly disposition, and a pair of horizontally disposed and spaced tubes are disposed one above the other in respective rear facing bores on the main tube.

2. The modular truck rack of claim 1 wherein each intermediate portion comprises a pair of elongated spaced parallel tubes interconnected by spaced vertical tubes.

3. The modular truck rack of claim 1 wherein each rear portion comprises:

a multi-segmented fancy bar having a first end segment in a vertical disposition, an arcuate rear facing second segment, a horizontal third segment and a sidewardly disposed U-shaped fourth segment having the second end in a horizontal disposition, a rear main support in the form of a vertical tube has its upper end disposed in a mirror image horizontal tube and said vertical tube is open at its bottom end, a pair of vertically spaced parallel wide tubes engage to said vertical main support in a forwardly disposition, and the first of which wide tubes receives the first segment of said fancy bar, the fourth segment of said fancy bar engaging said main support 180 degrees opposed from said spaced wide tubes, a narrow vertically disposed tube extends down from said third segment of the fancy bar in a position between said mirror image horizontal tube and said third segment of the fancy bar, said mirror image tube having an inwardly directed opening for the receipt of a transverse tube.

4. The truck rack of claim 3 wherein a vertical tube connects the two spaced wide tubes.

5. The truck rack of claim 1 wherein each of the mirror image front and each of the mirror image rear legs includes a tapered top section, a generally vertical second section, an angularly disposed third section and a mount plate attached to the end of the third section.

6. The truck rack of claim 1 further including a removable rear bar.

7. A modular truck rack comprising a pair of pre-sized components; namely left and right mirror image cab-over portions and left and right mirror image rear portions, which cab-over and rear portions are used in conjunction with at least two and no more than three transverse tubular members, each member of which at least two and no more than three transverse tubular members of varying extension, the exact extension depending upon the truck model to which the rack is to be fitted, said transverse members connecting respective right portions to respective left portions;

wherein each cab over portion comprises:

a J-shaped tube horizontally disposed and having an inward facing lower end and rear facing top end, which has a supported upper arch section welded thereto;

and having a short transverse inwardly extending tubular section, extending from said J-shaped tube normal to an upper vertical member is disposed inwardly from the rear facing top of the J-shaped member in a downwardly disposition, and a pair of horizontally disposed and spaced tubes are disposed one above the other in respective rear facing bores on the main tube;

a pair of mirror image front legs and a pair mirror image rear legs, each specifically chosen according to the model of truck, each leg having a mount bracket at one end thereof;

the end of the front legs not having amount bracket thereon, engaging its respective cab-over portion, and the end of the rear legs not having a mount bracket thereon engaging its respective rear portion.

8. The truck rack of claim 7 further including pins disposed at suitable locations to retain engaged parts together;

a pair of intermediate sections, each of which connects a cab-over portion to a rear portion, and each of which can be of the same varying extension.

9. The truck rack of claim 8 further including a removable rear bar.

* * * * *